United States Patent
Hollmer et al.

(10) Patent No.: US 11,750,136 B2
(45) Date of Patent: Sep. 5, 2023

(54) POWER SUPPLY APPARATUS FOR A PUBLIC ENTERTAINMENT APPARATUS HAVING ELECTRICALLY DRIVEN PASSENGER CARRIERS

(71) Applicant: Intrasys GmbH Innovative Transportsysteme, Munich (DE)

(72) Inventors: Tobias Hollmer, Munich (DE); Robert Sterff, Riedering (DE)

(73) Assignee: Intrasys Gmbh Innovative Transportsysteme, Munich (DE)

(*) Notice: Subject to any disclaimer, the term of this patent is extended or adjusted under 35 U.S.C. 154(b) by 0 days.

(21) Appl. No.: 17/170,756

(22) Filed: Feb. 8, 2021

(65) Prior Publication Data
US 2021/0249982 A1    Aug. 12, 2021

(30) Foreign Application Priority Data
Feb. 10, 2020 (DE) ..................... 10 2020 103 334.6

(51) Int. Cl.
  *H02P 27/06*   (2006.01)
  *H02J 4/00*    (2006.01)
  *B60L 50/60*   (2019.01)
  *A63G 7/00*    (2006.01)

(52) U.S. Cl.
  CPC .............. *H02P 27/06* (2013.01); *A63G 7/00* (2013.01); *B60L 50/60* (2019.02); *H02J 4/00* (2013.01); *B60L 2200/26* (2013.01); *B60L 2210/30* (2013.01); *B60L 2210/40* (2013.01)

(58) Field of Classification Search
  None
  See application file for complete search history.

(56) References Cited

U.S. PATENT DOCUMENTS

| 6,215,278 B1 | 4/2001 | Okamura et al. |
| 2011/0056407 A1 | 3/2011 | Roodenburg et al. |
| 2011/0316333 A1* | 12/2011 | Still ................ B60L 1/003 307/9.1 |
| 2013/0041514 A1 | 2/2013 | Apalenek et al. |

(Continued)

FOREIGN PATENT DOCUMENTS

| DE | 102015226092 A1 | 6/2017 |
| WO | WO 2021092658 * | 5/2021 ............... H02J 7/02 |

OTHER PUBLICATIONS

German Search Report for corresponding DE 10 2020 103 334.6 dated Jan. 18, 2021, 9 pgs.

(Continued)

*Primary Examiner* — Daniel Kessie
*Assistant Examiner* — Terrence R Willoughby
(74) *Attorney, Agent, or Firm* — Rankin, Hill & Clark LLP

(57) ABSTRACT

A power supply apparatus for furnishing short-term peak loads for an electrical drive system, encompassing an AC voltage source and a DC voltage source; a rectifier and a DC voltage conductor section being arranged between the AC voltage source and a connector configuration for electrical connection of the electrical drive system; the rectifier being connected on the input side to the AC voltage source and on the output side to the DC voltage conductor section; the DC voltage source being connected to the DC voltage conductor section in order to transfer electrical energy wherein the DC voltage source is a battery reservoir.

18 Claims, 1 Drawing Sheet

(56) References Cited

U.S. PATENT DOCUMENTS

| | | | |
|---|---|---|---|
| 2013/0138279 A1 | 5/2013 | Shi et al. | |
| 2013/0169045 A1* | 7/2013 | Lewis | H02J 9/04 |
| | | | 307/23 |
| 2014/0210389 A1* | 7/2014 | Niwa | H02P 5/74 |
| | | | 318/400.3 |
| 2015/0091478 A1 | 4/2015 | Marzano | |
| 2015/0094884 A1* | 4/2015 | Matsumura | B60L 3/04 |
| | | | 701/19 |
| 2018/0159416 A1 | 6/2018 | Julen et al. | |
| 2020/0144845 A1* | 5/2020 | Facchini | H02J 7/00034 |

OTHER PUBLICATIONS

Espacenet Bibliographic data: DE 102015226092 (A1), Published Jun. 22, 2017, 2 pgs.

* cited by examiner

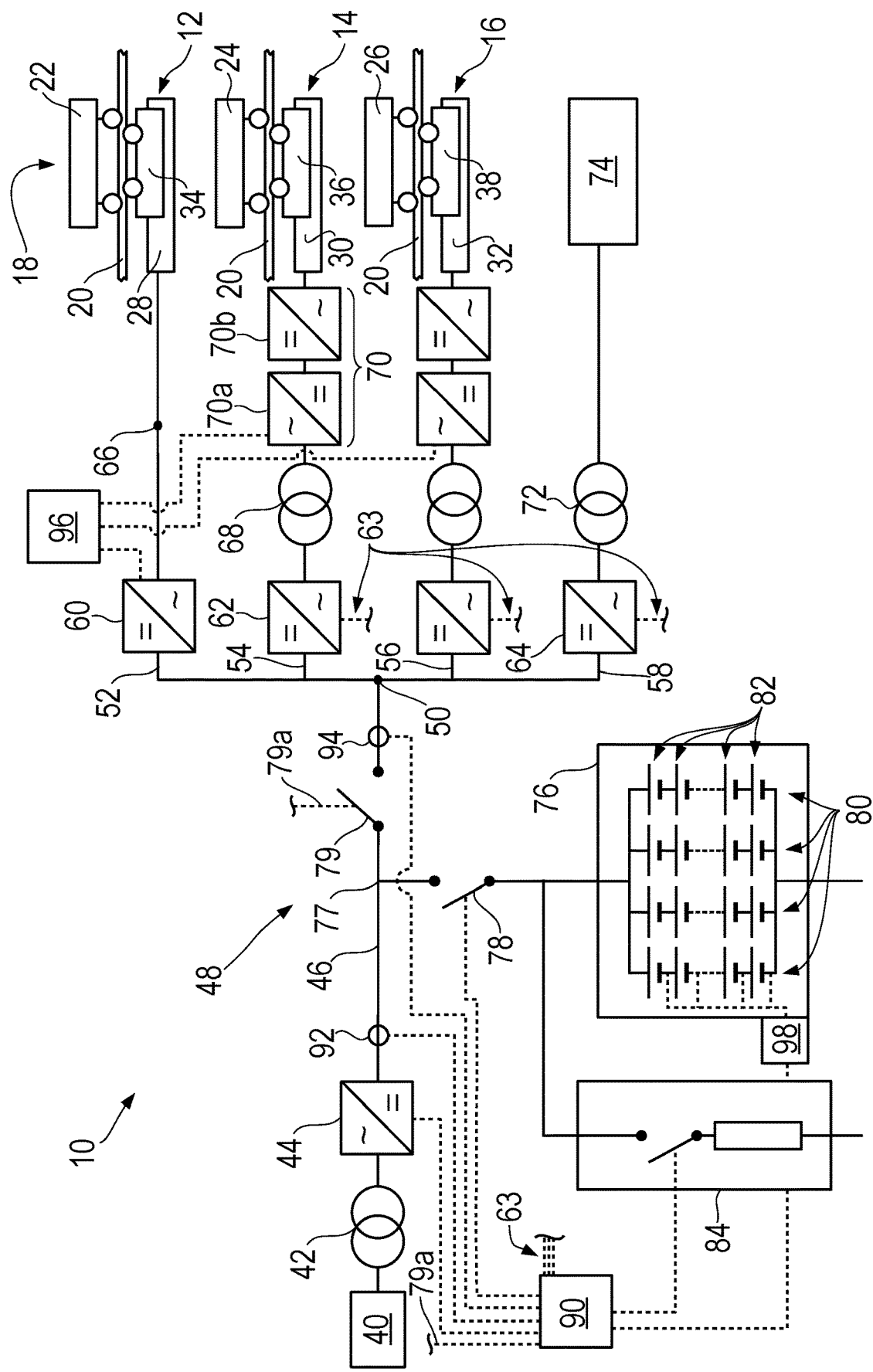

POWER SUPPLY APPARATUS FOR A PUBLIC ENTERTAINMENT APPARATUS HAVING ELECTRICALLY DRIVEN PASSENGER CARRIERS

This application claims priority in German Patent Application DE 10 2020 103 334.6 filed on Feb. 10, 2020, which is incorporated by reference herein.

The present invention relates to a power supply apparatus for furnishing short-term electrical peak loads for an electrical drive system, encompassing an AC voltage source and a DC voltage source; a rectifier and a DC voltage conductor section being arranged between the AC voltage source and a connector configuration for electrical connection of the electrical drive system; the rectifier being connected on the input side to the AC voltage source and on the output side to the DC voltage conductor section; and the DC voltage source being connected to the DC voltage conductor section in order to transfer electrical power. The electrical drive system connectable to the connector configuration is preferably a linear drive system. It can, however, also be an electrical drive system having a rotating rotor.

BACKGROUND OF THE INVENTION

DE 10 2015 226 092 A1 discloses a power supply apparatus of the species for supplying electrical energy to a public entertainment apparatus. What is envisioned here, as in the present invention, is principally a public entertainment apparatus in the form of an amusement ride, operation of which requires acceleration of a high-mass passenger carrier (weighing 2 metric tons or more) within a short time (approximately 2 to 8 seconds).

For example, the passenger carrier of the "Wicked" roller coaster in Farmington, Utah (US) is accelerated by linear synchronous motors with a maximum longitudinal acceleration of 1 G. Only moderate maximum speeds of less than 100 km/h are reached here, but this is because of the track layout of the roller coaster, according to which the passenger carrier is accelerated vertically to a reversal apex point at a height of 33 m.

A further example is the "Superman: Escape from Krypton" roller coaster in Valencia, Calif. (US), the passenger carriers of which are accelerated with a longitudinal acceleration of 1.2 G from 0 to more than 160 km/h in approximately 7 seconds. A passenger train of the roller coaster just mentioned holds 15 people; assuming an average weight of 75 kg per person, that alone means a payload of over 1 metric ton in addition to the empty weight of the passenger train.

The "Formula Rossa" in Dubai is at the leading edge of what is dynamically possible at the time of this Application: its passenger carriers are accelerated—albeit not electrically but hydraulically—from 0 to 240 km/h in less than 5 seconds. This indicates the trend in amusement ride design.

The electrical drive system of each of the first two roller coasters mentioned is a linear drive system, more precisely a linear synchronous motor. The power necessary for acceleration of the passenger carrier, which can briefly amount to several megawatts, usually can no longer be taken from a public power supply grid, constituting the AC voltage source, without undesired feedback into the grid.

The document recited therefore recommends taking a peak load, and optionally an intermediate load that is quantitatively between a peak load and a baseload, from an energy reservoir embodied separately from the public power supply grid. It is thus sufficient for the public power grid, constituting the AC voltage source, to supply only a grid-compatible baseload, withdrawal of which by the electrical drive system does not result in any undesired feedback into the power grid, while elevated loads exceeding the baseload are supplied by connectable energy reservoirs, for example supercapacitors or flywheels.

Power supply apparatuses that adhere to a supply principle which is similar in principle although different in detail are furthermore known from WO 2009/120063 A1 and US 2015 091478 A1.

A reservoir for electrical energy which is constituted from a plurality of supercapacitors, which in terms of design are double-layer capacitors, is known from U.S. Pat. No. 6,215,278 B1.

The use of flywheel reservoirs as energy reservoirs to supply peak loads constituting a power requirement during the operation of public-entertainment amusement rides has been common for some time. Flywheel reservoirs are expensive, however, and their storage duration is affected by losses over time, since the flywheel cannot rotate entirely without friction even in a flywheel housing having a good vacuum. In addition, flywheel reservoirs require an energy conversion from the kinetic energy that is actually stored in the flywheel into electrical energy, which again can be achieved only by accepting conversion losses.

Supercapacitors can directly store and then discharge electrical energy, so that the conversion losses that are unavoidable for flywheel reservoirs do not exist. A further advantage of supercapacitors is that they have a very high power density, i.e. can deliver comparatively large amounts of electrical energy in a short time.

A disadvantage of supercapacitors is their low energy density, i.e. an individual supercapacitor, or even an arrangement having several supercapacitors, can store only a relatively small amount of electrical energy for a given power delivery capability.

SUMMARY OF THE INVENTION

An object of the present invention is to overcome the above-described disadvantages of the known power supply apparatus, in particular for accelerating vehicles of public entertainment apparatuses, with no loss of performance.

The present invention achieves this object by way of a power supply apparatus of the species in which the DC voltage source is a battery reservoir.

In the present case, the term "battery reservoir" preferably refers to electrochemical storage reservoirs, rechargeable after at least partial discharge, for storing electrical energy. They are also referred to in technical parlance as "rechargeable batteries."

Battery reservoirs are an old, robust, and easily managed and manageable technology.

Because of their low power density, battery reservoirs have hitherto not been used as an energy reservoir for supplying electrical power for peak loads in order to accelerate vehicles of public entertainment apparatuses, having a vehicle mass of several tons, in less than ten seconds (for instance, 2 to 8 seconds) with an acceleration of more than 1 G. Battery reservoirs having the same quantitative energy storage capacity as supercapacitors or flywheel reservoirs can deliver considerably less electrical energy per unit time than the aforementioned supercapacitors or flywheel reservoirs.

It is to the credit of the inventors of the present invention that they have overcome this prejudice that prevails among specialists with respect to the use of battery reservoirs in order to accelerate passenger carriers of public entertainment apparatuses. In principle, battery reservoirs are capable of delivering the necessary quantity of energy in a short time, but they must be correspondingly dimensioned for that purpose. This means that a battery reservoir embodied to furnish drive system power for a predefined drive application has a considerably greater energy storage capability than an energy reservoir made up of supercapacitors and embodied to furnish the same power level for the same drive application. The battery reservoir appears to be overdimensioned in terms of energy storage capacity, as compared with a supercapacitor energy reservoir having the same power delivery capacity. This is necessary, however, in order to obtain a battery reservoir that can deliver the same quantity of energy as a supercapacitor reservoir in the short time period of approximately 2 to 8 seconds.

As will be explained below as an advantageous refinement of the present invention, this elevated energy storage capacity of the battery reservoir, compared with the energy storage capacity of a supercapacitor energy reservoir, has the advantageous effect that not only a short-term peak load but also, in addition to the peak load, a long-term continuous load, can be furnished with the energy reservoir. Known energy reservoirs hitherto used on public-entertainment amusement rides (supercapacitors and flywheel reservoirs) lack this continuous-load capability.

Because of the energy storage capacity of the battery reservoir which is necessary in order to achieve the requisite power delivery capacity, it is also possible to perform a plurality of drive operations on a passenger carrier of a public entertainment apparatus without delivering charge again to the battery reservoir in the meantime.

The AC voltage source can then be a public power supply grid that is always available, or a connector configuration for connecting the remainder of the power supply apparatus to a public power supply grid.

In particular when the power supply apparatus presented here is used to supply electrical energy to a public entertainment apparatus, in particular to a drive system of a public-entertainment amusement ride such as a roller coaster, ghost train, flume ride, and the like, the DC voltage conductor section is preferably part of a DC link circuit, so that the DC voltage conductor section electrically connects the output side of the rectifier to an input side of an inverter. The electrical drive system, which is supplied with power from the inverter, can then be connected to the output side of the inverter, optionally with interposition of further electrical components. The alternating-current frequency furnished at the output of the inverter is preferably modifiable, so that the motion of the passenger carrier moved by the electrical drive system that is supplied with power can be controlled, by a control apparatus of the electrical drive system, by way of a quantitative modification of the frequency of the alternating current outputted from the inverter.

The control apparatus of the electrical drive system, or a control apparatus of the power supply apparatus, can be embodied to carry out more than one drive operation, in particular more than one starting operation in which a passenger carrier of a public entertainment apparatus is accelerated from a standstill at at least 1 G for at least 2 seconds, preferably for at least 4 seconds, using only energy from the battery reservoir, with no intervening operation of charging the battery reservoir with energy from the AC voltage source.

The present invention accordingly also relates to a method for accelerating and/or decelerating a passenger carrier of a public entertainment apparatus, in particular of a public entertainment apparatus as described and refined in this Application, the passenger carrier being accelerated and/or decelerated at least twice, preferably more than twice, using only energy from a battery reservoir with no intervening operation of charging the battery reservoir with energy from the AC voltage source. The vehicle carrier is accelerated from a stop at more than 1 G preferably for more than two, by preference four, particularly preferably for more than six seconds. The mass of the passenger carrier is at least two metric tons.

Refinements of the method evident from the description of the apparatuses in this Application are also refinements of the above method, and vice versa.

The connector configuration recited previously can be a DC voltage connector terminal arrangement to which an inverter, for supplying alternating voltage to a stator part, connected thereto, of the electrical drive system, is electrically connectable.

Alternatively or additionally, the aforementioned connector configuration can be located on the output side of the inverter. It can be an AC voltage connector terminal arrangement to which the at least one stator part is electrically connectable.

For quantitative modification of the AC voltage supplied on the output side by the inverter, an output-side transformer can be connected to the output side of the inverter. As is usual for transformers, this is embodied to transform the AC voltage delivered from the inverter into a quantitatively differing AC voltage. It is thereby possible to connect to the power supply an electrical drive system of any desired power level, regardless of the AC voltage supplied by the AC voltage source. It is thus possible to connect, for example, an electrical drive system having a relatively low power level, which is used either as a positioning drive system for precise positioning of the passenger carrier or as an auxiliary drive system. For precise positioning of a passenger carrier, for instance in a station region of the passenger carrier, the performance of the main drive system can be too high to allow the passenger carrier to be controlled reliably so as to travel the desired short distances. The auxiliary drive system can be used if a higher-performance main drive system has failed.

The output-side transformer can advantageously be arranged between the inverter and a frequency converter, the frequency converter being embodied to modify a frequency of an AC voltage supplied from the output-side transformer into a quantitatively different frequency. A motion of a passenger carrier that is driven via an electrical drive system energized by the frequency converter can thus be controlled by modifying the output frequency of the frequency converter. This can be accomplished in turn by a control apparatus. This makes it possible to connect several electrical drive systems, which are mutually independently controllable, to the DC voltage conductor section. Alternatively or additionally, one or more than one electrical drive system can thereby be connected to the DC voltage conductor section with interposition of at least one inverter, and in addition at least one electrical continuous-load consumer that is preferably different from an electrical drive system, such as an illumination system, an emergency power supply for energizing the control apparatus of the electrical drive system and/or the power supply apparatus, and the like, can be connected. In contrast to the at least one electrical drive system, the continuous-load consumer consumes electrical energy continuously. The aforementioned at least one electrical drive system, conversely, is preferably operated only intermittently, as described above.

When more than one electrical drive system is connected on the output side of the inverter, a first electrical drive system can be connected to a first inverter without interposition of a transformer, and a second electrical drive system can be connected to a second inverter with interposition of the output-side transformer and/or of the frequency converter. In this case the first and the second electrical drive system can have different rated outputs, and the first and the second electrical drive system can be controlled mutually independently. For example, the first electrical drive system can be controlled by modifying the output frequency of the first inverter, and the second electrical drive system can be controlled by modifying the output frequency of the frequency converter. As a rule, in the context of the circuitry described in this paragraph the first electrical drive system has a higher rated output than the second electrical drive system. The first electrical drive system can be the main drive system of a passenger carrier along an acceleration section, and the second electrical drive system can be an auxiliary drive system of the passenger carrier having a lower power output. The auxiliary drive system can act along the same acceleration section as the main drive system, or can act on an auxiliary drive section differing from the acceleration section, for example at a reversal apex point, in order to move a passenger carrier, which has undesirably (and only exceptionally) come to a standstill there, into a downhill section in which the passenger carrier can once again begin to travel in response to gravity.

In a preferred embodiment, the power supply apparatus can comprise on its load side several conductor branches extending separately from one another; in at least two conductor branches electrical energy being furnishable by the power supply for a different duration, e.g. intermittently or continuously, and/or with a different electrical voltage, and/or with a different current intensity, and/or with a different frequency, to the electrical loads connectable or connected thereto.

Because of the high energy density and the comparatively low power density of the battery reservoir, in a context of power-oriented dimensioning of the battery reservoir in order to provide peak loads during acceleration of a passenger carrier weighing several (i.e. at least two) metric tons, at least one electrical load different from an electrical drive system can be connected on the output side of the inverter.

Alternatively or in addition to the aforementioned output-side transformer, an input-side transformer, which is embodied to transform a source AC voltage supplied by the AC voltage source into a quantitatively differing AC voltage, can be arranged between the AC voltage source and the inverter. It is thereby possible to ensure, for example, that an electrical drive system connected to the DC conductor section is supplied with quantitatively appropriate operating voltage via the DC conductor section and, optionally, via an interposed inverter.

The DC conductor section can comprise several parallel section branches, such that a different electrical load can be arranged on each section branch. For example, a first section branch can comprise the aforesaid first electrical drive system, a second section branch the aforementioned second electrical drive system, and if desired a third or further section branch can comprise one or several electrical loads that are not electrical drive systems. More than just the aforementioned two electrical drive systems can, of course, also be connected to the DC conductor section. The use of one dedicated section branch for each electrical drive system makes it possible to use a dedicated inverter and/or frequency converter for each section branch, and thus allows independent control of the electrical drive system associated with the respective section branch.

For maintenance purposes, the battery reservoir can be dischargeable through a discharge resistor without introduction of direct current into the DC voltage conductor section.

In terms of design, the battery reservoir preferably comprises a plurality of parallel-connected battery packets each preferably having a plurality of series-connected battery cells. The maximum current deliverable from the battery reservoir can be dimensioned by way of the number of parallel-connected battery packets. The number of series-connected battery cells determines the maximum achievable voltage of the battery reservoir.

The battery reservoir is preferably electrically connectable to and disconnectable from the DC voltage conductor section via a switching apparatus, in order to control charging of the battery reservoir and delivery of electrical current by the battery reservoir into the DC voltage conductor section. In a conducting state the switching apparatus creates the electrical connection; in a disconnected state it disconnects it. Disconnection of the battery reservoir from the DC voltage conductor section is furthermore advantageous if the battery reservoir is to be discharged into the DC voltage conductor section via the discharge resistor without energy delivery.

The DC voltage conductor section does not only serve to accept electrical current delivered from the battery reservoir. According to a preferred refinement of the invention, electrical energy can instead also be delivered via the DC voltage conductor section to the battery reservoir in order to recharge it via the DC voltage conductor section.

The battery reservoir can preferably be recharged by way of electrical energy of the AC voltage source. Additionally or alternatively, the battery reservoir can be rechargeable by way of recovered electrical energy generated during a deceleration operation of the electrical drive system.

The power supply can comprise a control apparatus that can control charging and discharging operations of the battery reservoir. The control apparatus can be embodied for that purpose to detect in the DC voltage conductor section, on both sides of the connection point of the battery reservoir to the DC voltage conductor section, the current flowing in the DC voltage conductor section. The control apparatus is preferably furthermore embodied to determine, from these detected currents, the current withdrawn from and delivered by the battery reservoir and, from that, the respective charge state of the battery reservoir.

The rectifier to whose output side the battery reservoir is connected via the DC voltage conductor section is preferably embodied with functions beyond mere rectification of an input-side AC voltage. This rectifier is preferably embodied to modify the output voltage and/or the output current of the rectifier. The current draw from the DC voltage source, i.e. as a rule from a public power supply grid, can thereby be regulated as a function of the power demand on the load side of the power supply apparatus. The rectifier can be embodied for that purpose as a so-called "active front end" (AFE). An AFE makes it possible, for example, in addition to rectification, to quantitatively increase a peak voltage of an AC voltage supplied from the power supply grid, and thereby to regulate the output current of the AFE.

Preferably the DC voltage conductor section has on its input side, particularly preferably the rectifier to whose output side the battery reservoir is connected via the DC voltage conductor section has, a precharging apparatus that allows the output DC voltage of the rectifier to be raised gradually from 0 V to the respectively selected rated voltage, preferably to be raised at least over a predetermined time span, particularly preferably to be raised in accordance with a predetermined time/voltage profile. The purpose of this is to precharge, in controlled fashion, capacitors that are present in downstream electrical components, in particular in inverters that are connected to the DC voltage conductor section directly or indirectly via interposed electrical components, and thereby to prevent undesirably high spontaneous charging currents. Such charging currents could occur if the recharged battery reservoir is coupled via the aforementioned switching apparatus to the DC voltage conductor section but is firstly electrically disconnected therefrom by the switching apparatus and is to be electrically conductively connected by the switching apparatus to the DC voltage conductor section, while capacitors arranged on the output side of the DC voltage conductor section, in particular on the DC voltage side of inverters, are discharged.

Because AFEs usually cannot output a DC voltage that is lower than the peak voltage of the input-side AC voltage, the DC voltage conductor section, preferably the rectifier, preferably additionally comprises the precharging apparatus even when the rectifier is embodied as an AFE.

The power supply apparatus preferably comprises a balancing apparatus that is known per se and is embodied to equalize, and to make as uniform as possible, quantitatively different charge states of series-connected battery cells that are encompassed by the battery reservoir. Different charge states of series-connected battery cells can occur as a result of production tolerances upon manufacture of the battery cells and due to aging of the battery cells during operation of the battery reservoir. The aforementioned control apparatus of the power supply apparatus preferably also controls the operation of the balancing apparatus.

The control apparatus of the power supply apparatus is furthermore preferably embodied for actuation of the aforementioned switching apparatus, and can switch it, depending on predetermined operating parameters and/or operating states of the power supply apparatus and/or of the battery reservoir, between its disconnected state and its conducting state, i.e. can disconnect the battery reservoir from, or electrically conductively connect it to, the DC voltage conductor section.

The power supply apparatus preferably comprises a conductor-section switching apparatus that is arranged in the DC voltage conductor section. The conductor-section switching apparatus is preferably arranged in the DC voltage conductor section in such a way that by actuation thereof into a disconnected state, both the rectifier to whose output side the DC voltage conductor section is connected, and the battery reservoir, are together disconnected from, or by actuation thereof into a conducting state are connected to, the load side of the power supply apparatus, in particular from/to that longitudinal end of the DC voltage conductor section which is remote from the rectifier. The conductor-section switching apparatus is preferably actuatable by the aforementioned control apparatus of the power supply apparatus. The conductor-section switching apparatus is thus arranged, when viewed from the output side of the rectifier, after the connection point of the battery reservoir to the DC voltage conductor section. The conductor-section switching apparatus is preferably arranged between the connection point of the battery reservoir and the aforementioned connector configuration for connecting an electrical drive system. When the battery reservoir is to be charged by current from the DC voltage source, the control apparatus can then switch the conductor-section switching apparatus into a disconnected state in which the battery reservoir is connected via the rectifier to the DC voltage source, but in which both the battery reservoir, as well as the DC voltage source and the rectifier, are disconnected from the load side of the power supply apparatus at which electrical loads take electrical power from the power supply apparatus.

In a normal operating state for operation of the power supply apparatus as intended, both the battery reservoir and the DC voltage source are connected to the load side of the power supply apparatus, i.e. the conductor-section switching apparatus (if it is present) is in the conducting state, and the aforementioned switching apparatus that can disconnect the battery reservoir from or connect it to the DC voltage conductor section is also in the conducting state.

The control apparatus of the power supply apparatus can furthermore be embodied to control at least one of the inverters that are connected on the input side to the DC voltage conductor section, and/or at least one of the aforementioned frequency converters. In the simplest case, that control can encompass activation and deactivation of at least one inverter or frequency converter. When a suitable inverter or frequency converter is used, the control apparatus can furthermore modify the frequency of the AC voltage supplied on the output side by the inverter or frequency converter. An inverter and/or a frequency converter having a modifiable output frequency can alternatively have control applied to it by a drive-system control apparatus embodied separately from the aforementioned control apparatus.

When an inverter is followed by a transformer for quantitative modification of the voltage outputted by the inverter, for cost reasons the inverter is preferably embodied to output only a DC voltage having an unmodifiable frequency.

The present invention further relates to a drive-system apparatus encompassing a power supply apparatus as described and refined above, and encompassing at least one drive-system part, from among a stator part and rotor part, of an electrical drive system supplied with power by the power supply apparatus; the electrical drive system being, for the reasons recited above, preferably a linear drive system, particularly preferably a linear synchronous motor, although a linear induction motor is also not to be excluded. Additionally or alternatively, the electrical drive system can encompass a rotating electric motor, here again the use of a synchronous motor or of an asynchronous motor also being conceivable. A further electrical load that is not an electrical drive system is preferably connected to the power supply apparatus of the drive-system apparatus.

The present invention further relates to a public entertainment apparatus, for example a roller coaster, ghost train, log flume or flume ride, encompassing: a motion track and a passenger carrier drivable to move in track-confined fashion on the motion track; an electrical drive system, preferably a linear drive system, constituting a motion drive system of the passenger carrier; a power supply apparatus, as described and refined above, for supplying power to the electrical drive system; and a control apparatus for controlling the electrical drive system and the charging and discharging operations of the battery reservoir.

The electrical drive system, preferably configured as a linear drive system, is particularly preferably a linear synchronous motor, although a linear induction motor is also not to be excluded. Additionally or alternatively, the electrical drive system can encompass a rotating electric motor, here again the use of a synchronous motor or of an asynchronous motor also being conceivable. The drive system of a passenger carrier of a public entertainment apparatus having a rotating electric motor can encompass a friction wheel that is mounted on the rotor and transfers an accelerating or, if desired, a decelerating force in mechanically frictionally engaged fashion to a passenger carrier that is moving past. According to an alternative, the rotating electric motor can drive, on the rotor side, a rotating magnetic disk along whose periphery are arranged permanent magnets having alternating polarization, so that during a rotation of the magnetic disk, a time-alternating magnetic field is present at a region that is stationary relative to the stator of the drive system and is adjacent to the rotating magnetic disk. This alternating magnetic is in turn capable of inducing eddy currents in an induction part of a passenger carrier, and thereby transferring an accelerating or decelerating force to the passenger carrier.

The control apparatus of the public entertainment apparatus preferably encompasses or is the aforementioned control apparatus of the power supply apparatus, which in particular is embodied to accelerate a passenger carrier, as described above, at least twice in succession, without intervening charging of the battery reservoir with energy from the AC voltage source, solely by discharge of the battery reservoir. Operation of the public entertainment apparatus can thereby be continued even in the event of a minutes-long power outage.

Preferably these several acceleration operations powered only by the battery reservoir each occur, from the standpoint of the passenger carrier, with the parameters recited in this Application in terms of acceleration magnitude, acceleration duration, and passenger carrier mass to be accelerated.

The motion track is a physical motion track, for example a rail arrangement and/or a chute that follows a trajectory predefined by the design of the physical motion track. The trajectory can be a closed trajectory, so that after one passage along the trajectory the passenger carrier ends up back at its starting point. The trajectory can also be an open trajectory, so that the passenger carrier either oscillates between two end points, or by way of a change in motion direction it passes in a reversed direction along the trajectory already traveled in order to return to its starting point.

A station at which passengers can board the passenger carrier that is then ready, and can depart from it, is provided as a rule at the aforementioned starting point.

In order to simplify the design of the power supply apparatus, the power supply apparatus itself and the components of the electrical drive system which are supplied with power by the power supply apparatus (i.e. at least the stator) are stationary. The components of the electrical drive system which are supplied with power can be arranged, for example, directly on the stationary physical motion track or on a stationary frame carrying the physical motion track. In the preferred case of a linear drive system energized by the power supply apparatus, components of the linear drive system which are not energized by the power supply apparatus are then carried along, as rotor parts, by the passenger carrier. A rotor part can encompass as an induction part a plurality of permanent magnets having alternatingly oriented polarization arranged one behind another, or only an electrically conductive plate.

In the case in which the aforementioned rotational electrical drive systems are used, the rotor that is directly drivable by the stator to rotate is arranged in stationary fashion on the motion track although rotatably relative to the stator.

The passenger carrier is consequently arranged on the motion track movably relative to the stator of the electrical drive system, in such a way that the passenger carrier can be moved closer to and farther from the stator.

These and other objects, aspects, features and advantages of the invention will become apparent to those skilled in the art upon a reading of the Detailed Description of the invention set forth below taken together with the drawing which will be described in the next section.

BRIEF DESCRIPTION OF THE DRAWINGS

The invention may take physical form in certain parts and arrangement of parts, a preferred embodiment of which will be described in detail and illustrated in the accompanying drawing which forms a part hereof and wherein:

FIG. 1, which schematically depicts an embodiment according to the present invention of the power supply apparatus of the present Application, and of a drive-system apparatus, a power supply apparatus, and a public entertainment apparatus of the present Application having such a drive-system apparatus.

DESCRIPTION OF PREFERRED EMBODIMENTS

Referring now to the drawing wherein the showings are for the purpose of illustrating preferred and alternative embodiments of the invention only and not for the purpose of limiting the same, in FIG. 1, an embodiment according to the present invention of a power supply apparatus of the present application is labeled in general with the number 10.

Power supply apparatus 10 serves to power electrical drive systems 12, 14, and 16 of a public entertainment apparatus 18 having passenger carriers 22, 24, and 26 guided along a stationary rail arrangement 20.

Electrical drive systems 12, 14, and 16 each encompass a respective stator part 28, 30, and 32 fastened in stationary fashion together with rail arrangement 20, and a respective rotor part 34, 36, and 38 arranged for motion together with passenger carriers 22, 24, and 26.

Passenger carriers 22, 24, and 26 can be a single carriage or a train constituted from several carriages. Passenger carriers 22, 24, and 26 can furthermore be the same passenger carriers at different points along rail arrangement 20, or can be different passenger carriers at the same point along rail arrangement 20 but at different times, or can be different passenger carriers at different points on rail arrangement 20.

Power supply apparatus 10 encompasses, as an AC voltage source 40, a connector to a public power supply grid which furnishes electrical energy in a manner that is predetermined for the respective public power supply grid.

AC voltage source 40 is followed by an input-side transformer 42 that quantitatively transforms the AC voltage supplied on the input side to a different AC voltage. Input-side transformer 42 is followed by a rectifier 44 that converts into a DC voltage the AC voltage that has been supplied by AC voltage source 40 and quantitatively modified by input-side transformer 42. A DC conductor section 46 of a DC link circuit 48 proceeds from the output side of rectifier 44.

Depending on the configuration of the power supply apparatus, a first connector configuration 50 in the exemplifying form of a DC connector terminal can be provided in DC conductor section 46. At least one conductor branch can be connected to this DC connector terminal 50. In the present case, four conductor branches 52, 54, 56 and 58 are connected. Conductor branches 54 and 56 are embodied identically, and serve merely to illustrate that any number of conductor branches can proceed from connector configuration 50. Because conductor branches 54 and 56 are identical, the only description given of them hereinafter will be of conductor branch 54, the description of which also applies to conductor branch 56.

Each of conductor branches 52 to 58 comprises a respective inverter 60, 62, and 64 that converts the DC voltage of DC voltage conductor section 46 on the output side into an AC voltage. DC link circuit 48 therefore ends at the respective inverters 60, 62, and 64.

Alternatively thereto, instead of one inverter for each conductor branch, one common inverter can be connected to DC conductor section 46; from that inverter, an electrical-energy-carrying conductor proceeds on the output side and optionally in turn branches into several conductor branches. A connector configuration in the form of an AC voltage connector terminal can then be arranged either centrally on the output side of the common inverter or in each conductor branch that branches off on the output side of the common inverter. An AC voltage connector configuration of this kind is labeled 66, by way of example, in conductor branch 52.

Stator part 28 of first conductor branch 52 is thus directly connected to inverter 60, so that the motion of passenger carrier 22 that can be accelerated and decelerated by stator part 28 can be controlled by a quantitative modification of the AC voltage frequency outputted by inverter 60.

In conductor branch 54, and also in conductor branch 56, the local inverter 62 is followed by an output-side transformer 68 that quantitatively transforms the AC voltage outputted by inverter 62 into a different AC voltage. Output-side transformer 68 is followed by a frequency converter 70 that is constituted by a combination of a rectifier 70a with an inverter 70b subsequent thereto. Electrical drive system 14 connected to conductor branch 54 can be an auxiliary drive system having a lower rated output than electrical drive system 12 of first conductor branch 52, which can be, for example, a main drive system having a higher rated output. Auxiliary drive system 14 can be arranged at a critical location along rail arrangement 20 in order to move a passenger carrier that has undesirably (and only exceptionally) come to a standstill there. One such critical location can be, for example, a changeover point, located at a relatively great height above the ground, between an uphill and a downhill section of a passenger carrier. At this critical location, what is important above all is simply to be able to move a passenger carrier. Large accelerations, such as those at the starting point of the motion path of the passenger carriers, are not necessary at this location.

Alternatively, auxiliary drive system 14 can be provided as a positioning drive system for positioning passenger carrier 24 into a predetermined position. It can be provided, for example, at a station of public entertainment apparatus 18 in order to bring passenger carrier 24 into a predetermined position in which boarding openings of passenger carrier 24 align exactly with access openings of the station. This can be necessary as a safety feature in order to allow passengers to board and depart from the passenger carrier only when the passenger carrier is in a predetermined position. The above-described weaker auxiliary drive system 14 is preferably used for a positioning motion of this kind with short movement travels and low movement speeds, in order to preclude incorrect control of the substantially higher-powered main drive system 12.

In conductor branch 58, inverter 64 is followed an output-side transformer 72, and the latter is followed by at least one electrical load 74 which is not an electrical drive system but is a continuous-load consumer that continuously consumes electrical energy, for example an emergency power supply, an illumination system, and the like. It is to be assumed here that inverter 64 outputs an AC voltage having a frequency that is correct for the at least one load 74, so that there is no need for control with regard to the frequency of the AC voltage in conductor branch 58. The AC voltage outputted from inverter 64 can, however, be quantitatively adapted by output-side transformer 72 to the needs of the at least one electrical load 74.

In the present example, stator parts 28, 30, and 32 energized by power supply apparatus 10, as well as electrical load 74, constitute the load side of power supply apparatus 10 as recited in the introduction to the description.

Electrical drive system 12 in particular, constituting a main drive system of public entertainment apparatus 18, requires a very large amount of electrical power for a short time in order to accelerate passenger carrier 22. Depending on capacity and design, it is not unusual for the mass of passenger carrier 22 which is to be accelerated to be at least 6 to 10 metric tons, which is accelerated at more than 1 G in a time span from 2 to 8 seconds, in particular 4 to 6 seconds. This acceleration work must be performed in each travel cycle, i.e. approximately every 60 to 120 seconds.

An acceleration power level in the megawatt range that results from this during the acceleration phase cannot be taken via connector configuration 40 from the public power supply grid without undesired feedback. For example, in a public power supply grid electrically coupled to a public entertainment apparatus 18 it is simply not acceptable for electrical illumination systems and the like to flicker with each travel cycle because public entertainment apparatus 18, in order to accelerate its passenger carriers 22, 24, and 26, is pulling so much power from the public grid that sufficient electrical power is no longer available for the other users of the public grid.

In order for the electrical peak load power necessary for acceleration of the passenger carriers not to be taken from the public power supply grid via connector configuration 40, and thus to relieve loads on the public power supply grid, a battery reservoir 76, which is connected via a switching apparatus 78 to DC conductor section 46, is provided in power supply 10. Battery reservoir 76 comprises a plurality of parallel-connected battery packets 80 each having a plurality of series-connected battery cells 82.

By way of switching apparatus 78, battery reservoir 76 is electrically connectable to and disconnectable from DC voltage conductor section 46, and can thereby deliver stored power into DC voltage conductor section 46 and can be recharged by AC voltage source 40 after delivering the stored power. Electrical energy generated by regenerative deceleration of passenger carriers 22, 24, and 26 can also be fed into battery reservoir 76.

Battery reservoir 76 can be electrically discharged via a switchable discharge resistor 84 for maintenance purposes, without requiring that the electrical energy previously stored in battery reservoir 76 be delivered for that purpose into DC conductor section 46. It is sufficient for this purpose to disconnect battery reservoir 76 from DC voltage conductor section 46 via switching apparatus 78, and to discharge battery reservoir 76 via discharge resistor 84.

In the example depicted there is provided, in a conductor branch of DC voltage conductor section 46 which is located between connection point 77 of battery reservoir 76 to DC voltage conductor section 46 and connector configuration 50, a conductor-section switching apparatus 79 that, like switching apparatus 78, is switchable between a conducting state in which the switching apparatus conveys electrical current and a disconnected state in which the switching apparatus disconnects the electrical conductor in which it is arranged.

A control apparatus 90 of power supply apparatus 10 can be embodied to actuate switching apparatus 78 and conductor-section switching apparatus 79 between the states recited. In the interest of better clarity, control conductor 79a extending between control apparatus 90 and conductor-section switching apparatus 79 is shown only in its end regions.

Control apparatus 90 can furthermore be embodied to control the operation of rectifier 44, which is preferably embodied as the aforementioned AFE. In addition, the aforementioned precharging apparatus can be integrated into rectifier 44, said apparatus allowing the DC voltage outputted from rectifier 44 on the output side to be quantitatively increased, over a predetermined or predeterminable time span, from 0 V to a desired rated voltage in order to prevent undesirably high currents from being spontaneously drawn, when battery reservoir 76 is suddenly switched into DC voltage conductor section 46 by switching apparatus 78, by any discharged or at least partly discharged capacitors provided in inverters 60, 62, and/or 64.

For charging of battery reservoir 76 by way of electrical energy supplied by DC voltage source 40, control apparatus 90 can switch conductor-section switching apparatus 79 into the disconnected state so that energy supplied from AC voltage source 40 flows exclusively into battery reservoir 76.

For that purpose, control apparatus 90 can detect the current flowing respectively at measurement arrangements 92 and 94 and can ascertain therefrom the charge state of battery reservoir 76 and optionally a charge requirement of battery reservoir 76. The control apparatus can actuate conductor-section switching apparatus 79 depending on the charge state that is ascertained.

Before actuation of switching apparatuses 78 and 79, the voltages present on both sides of the switching apparatus should be at least brought quantitatively close to one another, or preferably equalized, as already indicated above.

Measurement arrangements 92 and 94 are arranged for that purpose in such a way that one measurement arrangement (in the present case measurement arrangement 92) detects only the current supplied by AC voltage source 40, and the other measurement arrangement (in this case measurement arrangement 94) detects the current fed into DC voltage conductor section 46 both by AC voltage source 40 and by battery reservoir 76. With a knowledge of the respective switching states of switching apparatuses 78 and 79, control apparatus 90 can determine the charge state of battery reservoir 76 from the currents ascertained at measurement arrangements 92 and 94, for example by balancing the currents.

In the present example, control apparatus 90 can control inverters 62 and 64 if they are embodied to output a modifiable-frequency AC voltage. This is indicated by control-conductor arrangement 63. In this case control apparatus 90 can establish the AC voltage frequency respectively outputted at the relevant inverters 62 and/or 64. In the example depicted, however, inverters 62 and 64 are preferably embodied only to output an AC voltage having a constant frequency defined by the design of the inverters.

Control apparatus 90 can furthermore control inverter 60 and frequency converter 70 and can thereby modify the frequency outputted by them. Control apparatus 90 can thereby serve as a motion control system for passenger carriers 22, 24, and 26. Alternatively, motion control of passenger carriers 22, 24, and 26 can be effected by a separate motion control apparatus 96 which is embodied, instead of control apparatus 90, to modify the AC voltage frequency outputted by inverter 60 and/or by frequency converter 70, and which can be correspondingly connected to inverter 60 and/or to frequency converter 70.

Control apparatus 90 can furthermore control discharge resistor 84, for instance by actuation of the switch depicted in discharge resistor 84.

The battery reservoir can furthermore be coupled to a balancing apparatus 98 that is known per se and balances different charge states in series-connected battery cells 82. Different charge states of this kind can occur as a result of aging processes that act differently and/or due to different production precision, even though a charging current flowing through battery cells 82 is uniform and/or despite uniform discharge. The operation of balancing apparatus 98 can also be controlled by control apparatus 90.

When a "discharge" or "discharge operation" of the battery reservoir is referred to in the present Application, this simply refers to a decrease in the charge state of the battery reservoir, i.e. a decrease in the electrical energy stored in the battery reservoir, but not to complete discharge of the battery reservoir, which is undesirable for technical reasons.

Operating parameters of public entertainment apparatus 18 having power supply apparatus 10, as depicted in FIG. 1, will be indicated by way of example below:

AC voltage source 40, constituting a medium-voltage grid, supplies a three-phase AC voltage at a constant 50 or 60 Hz at a voltage of 10 kV. Three-phase transformer 42 transforms this to 600 V on the output side.

Rectifier 44, embodied as an AFE, supplies from this on the output side a DC voltage of 1000 V and a current of between 0 and 5000 A.

Inverter 60 of the main drive system supplies an AC voltage having a variable frequency of between 0 and 200 Hz. Inverter 60 supplies an output voltage of 690 V and an output current of up to approximately 2000 A.

Inverters 62 and 64 supply an AC voltage of 690 V at a constant frequency of either 50 Hz or 60 Hz.

Transformer 68 of the auxiliary drive system generates on the output side, from the primary AC voltage of 690 V, a secondary AC voltage of 480 V.

Transformer 72 generates on the output side, from the primary AC voltage of 690 V, a secondary AC voltage of 230 V.

The values recited above are merely examples, and can also have different magnitudes.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A power supply apparatus for furnishing short-term electrical peak loads for an electrical drive system, the power supply apparatus encompassing an AC voltage source and a DC voltage source; a rectifier and a DC voltage conductor section being arranged between the AC voltage source and a connector configuration for electrical connection of an associated electrical drive system; the rectifier being connected on an input side to the AC voltage source and on an output side to the DC voltage conductor section; the DC voltage source selectively providing DC power directly to the DC voltage conductor section in order to transfer electrical energy, wherein the DC voltage source is a battery reservoir; wherein the DC voltage conductor section is part of a DC link circuit, so that the DC voltage conductor section electrically connects the output side of the rectifier to an input side of an inverter; the electrical drive system comprising a linear motor drive having a stator part and a rotor part wherein the rotor part is fixed relative to an associated vehicle and is arranged for motion together with the associate vehicle; the stator part being stationary and the stator part being fixed relative to a physical motion track, the DC link circuit and the battery reservoir.

2. The power supply apparatus according to claim 1, wherein an output-side transformer, which is embodied to transform the AC voltage delivered from the inverter into a quantitatively differing AC voltage, is connected to an output side of the inverter.

3. The power supply apparatus according to claim 1, wherein the associated electrical drive system is located on the output side of the inverter.

4. The power supply apparatus according to claim 1, wherein an electrical continuous-load consumer that at least continuously consumes electrical energy is connected on an output side of the inverter, the continuous-load consumer preferably being different from an electrical drive system.

5. The power supply apparatus according to claim 1, wherein an input-side transformer, which is embodied to transform a source AC voltage supplied by the AC voltage source into a quantitatively differing AC voltage, is arranged between the AC voltage source and the inverter.

6. The power supply apparatus according to claim 1, wherein the battery reservoir comprises a plurality of parallel-connected battery packets each having a plurality of series-connected battery cells.

7. The power supply apparatus according to claim 1, wherein the battery reservoir is electrically connectable to and disconnectable from the DC voltage conductor section via a switching apparatus.

8. The power supply apparatus according to claim 1, wherein the battery reservoir is chargeable via the DC voltage conductor section.

9. The power supply apparatus according to claim 8, wherein the battery reservoir is chargeable at least one of by way of electrical energy of the AC voltage source and by way of recovered electrical energy generated during a deceleration operation of the electrical drive system.

10. A drive apparatus encompassing a power supply apparatus according to claim 1 and at least one drive-system part, from among a stator part and a rotor component, of an electrical drive system, supplied with power by the power supply apparatus.

11. The power supply apparatus according to claim 1, wherein the single AC voltage source is from a public power supply grid.

12. A power supply apparatus for furnishing short-term electrical peak loads for an electrical drive system, the power supply apparatus encompassing an AC voltage source and a DC voltage source; a rectifier and a DC voltage conductor section being arranged between the AC voltage source and a connector configuration for electrical connection of an associated electrical drive system; the rectifier being connected on an input side to the AC voltage source and on an output side to the DC voltage conductor section; the DC voltage source selectively providing DC power directly to the DC voltage conductor section in order to transfer electrical energy, wherein the DC voltage source is a battery reservoir; wherein the DC voltage conductor section is part of a DC link circuit, so that the DC voltage conductor section electrically connects the output side of the rectifier to an input side of an inverter, wherein an output-side transformer, which is embodied to transform the AC voltage delivered from the inverter into a quantitatively differing AC voltage, is connected to an output side of the inverter; wherein the output-side transformer is arranged between the inverter and a frequency converter, the frequency converter being embodied to modify a frequency of an AC voltage supplied from the output-side transformer into a quantitatively different frequency.

13. The power supply apparatus according to claim 12, wherein the associated electrical drive system is located on the output side of the inverter.

14. The power supply apparatus according to claim 13, wherein the associated electrical drive system includes a first associated electrical drive system and a second associated electrical drive system both connected on the output side of the inverter, the inverter including a first inverter and a second inverter, the first associated electrical drive system being connected to the first inverter without interposition of an output-side transformer; and the second associated electrical drive system being connected to the second inverter with interposition of the output-side transformer and of the frequency converter.

15. The power supply apparatus according to claim 13, wherein an electrical continuous-load consumer that at least continuously consumes electrical energy is connected on the output side of the inverter, the continuous-load consumer preferably being different from an electrical drive system.

16. A power supply apparatus for furnishing short-term electrical peak loads for an electrical drive system, the power supply apparatus encompassing an AC voltage source and a DC voltage source; a rectifier and a DC voltage conductor section being arranged between the AC voltage source and a connector configuration for electrical connection of an associated electrical drive system; the rectifier being connected on an input side to the AC voltage source and on an output side to the DC voltage conductor section; the DC voltage source selectively providing DC power directly to the DC voltage conductor section in order to transfer electrical energy, wherein the DC voltage source is a battery reservoir; wherein the DC voltage conductor section is part of a DC link circuit, so that the DC voltage conductor section electrically connects the output side of the rectifier to an input side of an inverter, wherein an output-side transformer, which is embodied to transform the AC voltage delivered from the inverter into a quantitatively differing AC voltage, is connected to an output side of the inverter; wherein the associated electrical drive system includes a first associated electrical drive system and a second associated electrical drive system both connected on the output side of the inverter, the inverter including a first inverter and a second inverter, the first associated electrical drive system being connected to the first inverter without interposition of an output-side transformer; and the second associated electrical drive system being connected to the second inverter with interposition of the output-side transformer and of the frequency converter.

17. A power supply apparatus for furnishing short-term electrical peak loads for an electrical drive system, the power supply apparatus encompassing an AC voltage source and a DC voltage source; a rectifier and a DC voltage conductor section being arranged between the AC voltage source and a connector configuration for electrical connection of an associated electrical drive system; the rectifier being connected on an input side to the AC voltage source and on an output side to the DC voltage conductor section; the DC voltage source being connected to the DC voltage conductor section in order to transfer electrical energy, wherein the DC voltage source is a battery reservoir, wherein the battery reservoir is dischargeable through a discharge resistor without introduction of direct current into the DC voltage conductor section.

18. A public entertainment apparatus encompassing: a motion track and a passenger carrier drivable to move in track-confined fashion on the motion track; an electrical drive system constituting a motion drive system of the passenger carrier; a power supply apparatus for furnishing short-term electrical peak loads for an electrical drive system, the power supply apparatus encompassing an AC voltage source and a DC voltage source; a rectifier and a DC voltage conductor section being arranged between the AC voltage source and a connector configuration for electrical connection of an associated electrical drive system; the rectifier being connected on an input side to the AC voltage source and on an output side to the DC voltage conductor section; the DC voltage source being connected to the DC voltage conductor section in order to transfer electrical energy, wherein the DC voltage source is a battery reservoir; and a control apparatus for controlling the electrical drive system and the charging and discharging operations of the battery reservoir.

* * * * *